No. 807,527. PATENTED DEC. 19, 1905.
H. C. WILSON.
WAIST AND SKIRT HOLDER.
APPLICATION FILED OCT. 2, 1905.
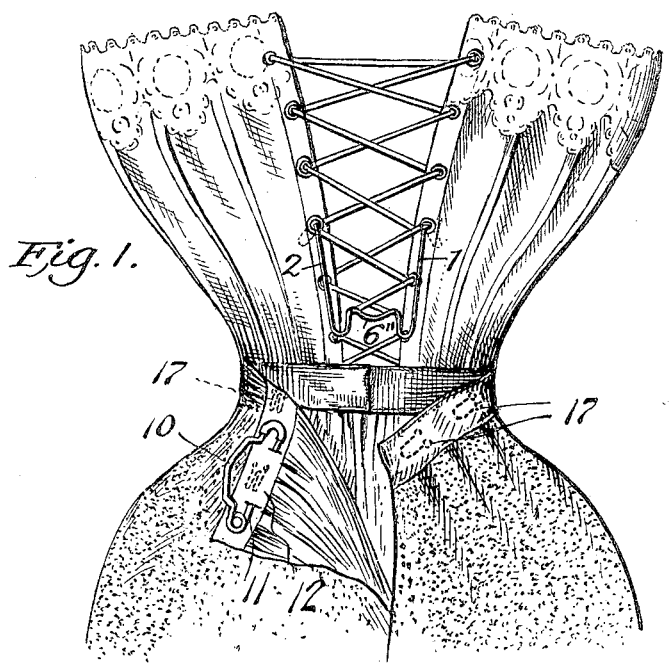
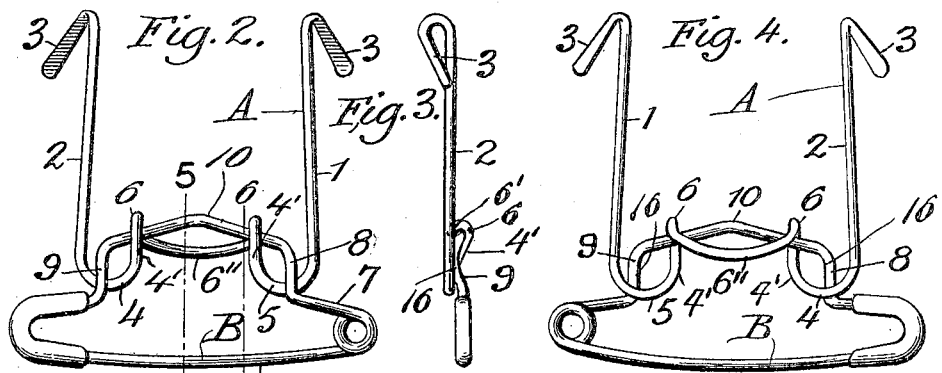
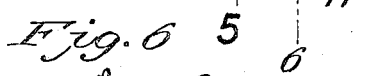
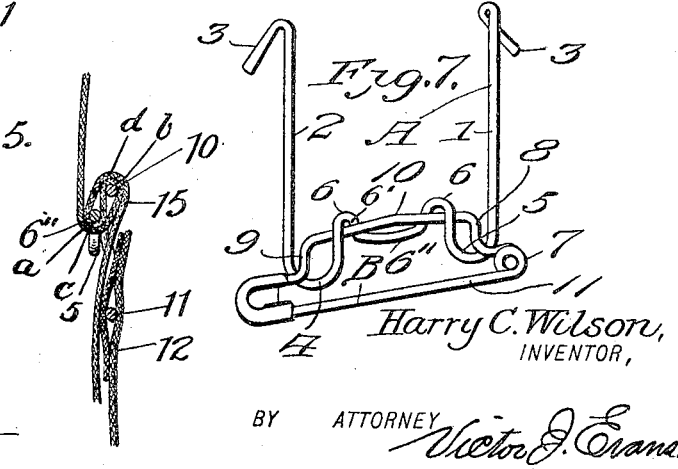
WITNESSES:
James F. Duhamel
Geo. Ackman
Harry C. Wilson,
INVENTOR,
BY ATTORNEY
Victor J. Evans

UNITED STATES PATENT OFFICE.

HARRY C. WILSON, OF NEW YORK, N. Y.

WAIST AND SKIRT HOLDER.

No. 807,527.  Specification of Letters Patent.  Patented Dec. 19, 1905.

Application filed October 2, 1905. Serial No. 281,082.

*To all whom it may concern:*

Be it known that I, HARRY C. WILSON, a citizen of the United States, residing at New York city, in the county of New York and State of New York, have invented new and useful Improvements in Waist and Skirt Holders, of which the following is a specification.

The invention relates to a combined skirt-supporter and waist-holder designed to be removably connected with the corset of the wearer and serviceable for simultaneously supporting the skirt and holding the waist down in proper relative position to the skirt-band.

The main object of the present invention is the production of a supporter of the class described comprising two independent members adapted for connection by a single movement and constructed to interlock when in connected relation to prevent accidental disengagement.

With the above object in view the invention consists in a hook member adapted for removable connection with a corset or other garment and an eye member arranged for manual connection with the hook member, the hook member being provided with main hooks and auxiliary hooks, the terminals of which extend in opposite directions, and the eye member having an engaging bar, said hook member and eye member being formed to force the engaging bar into the auxiliary hooks of the hook member as the eye member is moved into operative engaging relation with the hook member.

The invention will be described in the following specification, reference being had particularly to the accompanying drawings, in which—

Figure 1 is a view showing the application of my improved supporter, the members thereof being shown disconnected; Fig. 2, a front elevation of the supporter, the members being shown in connected relation, with the garments omitted. Fig. 3 is a side elevation of the same. Fig. 4 is a rear elevation of the same. Fig. 5 is a vertical sectional view taken on the line 5 5 of Fig. 2, the relative arrangement of the waist and skirt when the parts are connected being shown. Fig. 6 is an enlarged section on the line 6 6 of Fig. 2, the arms being broken off and the parts shown in connected relation, with the garments omitted. Fig. 7 is a perspective view of the hook and eye members shown in connected relation, the garments being omitted.

Referring to the drawings, wherein like reference characters indicate like parts throughout the several views, my improved supporter comprises two independent members, a hook member, as A, adapted for removable connection with a corset, and an eye member, as B, which is preferably constructed in safety-pin form and adapted for removable connection with the band of the skirt.

The hook member, which is preferably constructed of wire, comprises a body portion, including parallel arms 1 and 2, which are to be of a length desired and formed at their upper ends to provide hook portions 3. The free terminals of the hooks 3 are preferably flattened to decrease the diameter of the material and enhance the comfort of the wearer, said hook portions being designed to engage any two opposing eyelets of the corsets, as shown in Fig. 1. The hook members 3 are preferably formed by bending the material rearwardly and outwardly and downwardly, the downwardly-extended portions projecting laterally of the arms, whereby to prevent accidental disengagement from the corset when in place.

The lower ends of the arms 1 and 2 are bent to provide hooks 4 and 5, respectively, each of said hooks being duplicate, with their terminal members 4' lying forward of the plane of the arms 1 and 2 and between the respective arms. The upper ends of the terminal members 4' are bent to provide auxiliary hooks 6, the terminals 6' of which extend toward the plane of the arms 1 and 2—that is, in the opposite direction to the terminals 4' of the main hooks. The terminals 6' are connected by a cross-bar 6", said terminals being so positioned as to arrange said cross-bar substantially in the plane of the arms 1 and 2.

The eye member B is preferably of the safety-pin type, having the usual pin-bar 11 and the main bar 7, the latter being terminally provided with the spring for the pin-bar and with the keeper to receive the pointed end thereof. The main bar of the eye member is bent intermediate its ends to provide an upwardly-extending loop, including opposite ends 8 and 9 and an engaging or cross bar 10, connecting the ends. The ends 8 and 9 of the loop are bent inwardly—that is, toward the corset in the operative position of the parts—and then outwardly, as shown at 16, so that the bar 10 lies substantially in the plane formed by the bars 7 and 11, which constitute the body of the eye member. The engaging bar 10 is bent slightly outward at a point midway its length to provide an approximate V formation, the apex thereof being slightly elevated above the ends of the bar.

In connecting the parts without the insertion of the garments the eye member tilted from the vertical is passed over the auxiliary-hook terminals 6' and downward beneath the cross-bar 6", with the engaging bar resting in contact with the terminals 4' of the main hooks and within the auxiliary hooks. In moving the eye member to its normal operative position, which is in substantial alinement with the hook member, the curved portions 16 of the ends 8 and 9 of the loop of the eye member ride upon the lower parts of the main hooks with the effect to force the engaging bar 10 upward and into the auxiliary hooks, practically clamping said engaging bar into position within said auxiliary hooks. In this position of the parts, which is the operative position, it will be noted that the apex of the engaging bar rests intermediate the terminals 4' of the main hooks and extends outwardly from the plane of the arms 1 and 2.

In using the supporter with the garments the hooks 3 of the hook member are engaged with the eyelets of the corset and the eye member caused to engage the band of the skirt through the medium of the pin-bar. The waist and other garments overlying the corset are turned down in front of the hook member, concealing the same. The eye member is now placed over—that is, outside of the overlying garments—and is then engaged with the hook member, as above described, causing the waist 15 to assume the folds illustrated in section in Fig. 5 and indicated at $a$, $b$, $c$, and $d$, the clamping action of the engaging bar within the auxiliary hooks serving to bind the material snugly in place at this point.

The hook-and-eye fastening 17 of the band of the skirt 12 adds materially to the proper holding means of the respective members, as said fastenings tend to secure the skirt-band more or less tightly about the body of the wearer, and thereby exert a direct pressure upon the body portion of the eye member. This binding action of the skirt-band upon the eye member, aided by the weight of the skirt, is effective to maintain said eye member in an upright or operative plane, in which position the engagement of the parts described will prevent any accidental separation of the members.

Having thus described the invention, what is claimed as new is—

1. A supporter comprising a hook member and an eye member, the hook member being provided with a main hook and with an auxiliary hook, the terminals of said hooks extending in opposite directions, the eye member being formed with an engaging bar adapted to engage the terminal of the main hook and lie within the auxiliary hook, said hook member and eye member being respectively formed to cause the engaging bar of the eye member to ride into the auxiliary hook as the eye member is moved into operative engaging relation with the hook member.

2. A skirt-supporter comprising a hook member terminally bent to provide main hooks and auxiliary hooks, the terminal portions of said main hooks lying forward of the plane of the body of the hook member, the terminals of the auxiliary hooks extending in a direction opposite to the main-hook terminals, and an eye member having an engaging bar adapted to engage the main-hook terminals and lie within the auxiliary hooks, said hook member being respectively formed to provide coöperating parts adapted in the operative assembling of said members to cause the engaging bar to be forced within the auxiliary hooks.

3. A skirt-supporter comprising a hook member and an eye member, the hook member being formed to provide main hooks whose terminals are arranged forward of the plane of the body of the hook member and to provide auxiliary hooks, the terminals of the respective hooks extending in opposite directions, the eye member being provided with a loop having end bars and an engaging bar adapted when connected with the hook member to engage the main-hook terminals and lie within the auxiliary hooks, the end bars being formed to coöperate with the hook member and force said engaging bar within the auxiliary hooks of the hook member in the operative connection of the members.

4. A skirt-supporter comprising a hook member and an eye member, the hook member being formed to provide main hooks and auxiliary hooks, the terminals of the respective hooks extending in opposite directions, the eye member being provided with an engaging bar having an approximately V shape, said engaging bar being adapted to engage the terminals of the main hooks and lie within the auxiliary hooks with the apex of said engaging bar projecting outwardly from the plane of the body of the hook member.

5. A waist and skirt holder comprising a corset-engaging member having two arms each formed at the upper end thereof with a rearwardly and downwardly bent portion, the lower ends of the two arms being integral with each other and being bent to form an upwardly-extending hook-terminal having a downwardly and inwardly bent portion at its upper end, and a safety-pin having a loop formed with a V bend to engage the hook-terminals on the corset-engaging member and be interlocked within the downwardly and inwardly bent portions thereof, substantially as described.

6. A waist and skirt holder comprising a corset member having two arms each formed at the upper end thereof with a rearwardly and downwardly bent hook portion, the lower ends of the two arms being integral with each other and being bent to form upwardly-extending hook-terminals having a downwardly and inwardly bent portion at their upper ends and a curved connecting member, and a safety-pin member having the upper bar thereof bent to form a loop having its ends curved inward and outward and its connecting-bar formed with a V bend.

In testimony whereof I have affixed my signature in presence of two witnesses.

HARRY C. WILSON.

Witnesses:
PETER A. LAURIA,
W. H. CRICHTON-CLARKE.